Figure 1:
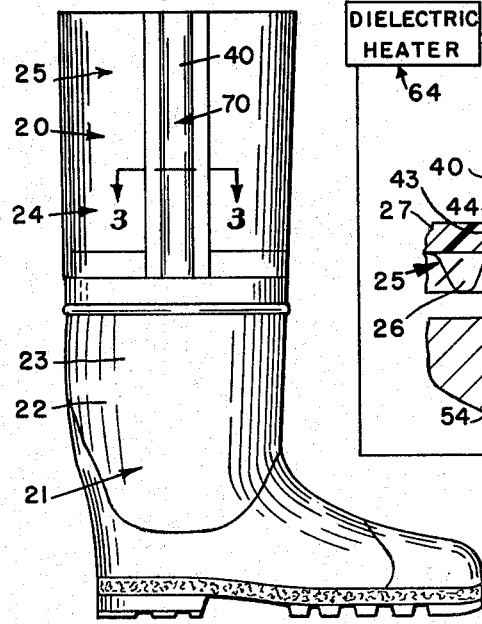

May 25, 1965  P. N. DUNHAM  3,185,612
SEAMED ARTICLE AND METHOD FOR MAKING SAME
Filed Oct. 16, 1961

INVENTOR.
PHILIP N. DUNHAM
BY
Pearson + Pearson
ATTORNEYS

United States Patent Office 3,185,612
Patented May 25, 1965

3,185,612
SEAMED ARTICLE AND METHOD FOR
MAKING SAME
Philip N. Dunham, Nashua, N.H., assignor to Hampshire
Manufacturing Corporation, Nashua, N.H., a corporation of New Hampshire
Filed Oct. 16, 1961, Ser. No. 145,221
9 Claims. (Cl. 161—95)

This disclosure relates to a fluid tight seamed article of thermoplastic sheet material and a process for making the same.

In the art of making articles of thermoplastic sheet material such as air mattresses, wading boots and the like, at least one seam is usually necessary to properly shape and finish the article and the seam must usually be fluid tight, freely flexible and strong. The sheet material may be entirely of thermoplastic, or consist of a woven fabric having a layer of thermoplastic thereon, and the seam has heretofore been made by heat sealing, or welding, adjacent marginal thermoplastic faces together under substantial heat and pressure. The margins of the sheets have usually been overlapped and superimposed but heat sealing the same has not been entirely satisfactory or durable because the high temperature necessary to fuse the margins has damaged and weakened the material. In fact the zone of heat sealing has tended to become brittle to the extent that the zone loses flexibility, the seam tends to separate and fracture along a line of shear coinciding with the boundary lines of the seam and, where woven fabric is thermoplastic coated, the coating tends to rip off under stress.

The principal object of this invention is to provide an article of imperforate, thermoplastic sheet material with a heat sealed, or welded, fluid tight seam which is freely flexible at the seam and, therefore, has no sharply defined line of shear.

Another object of the invention is to provide a method for fluid tight seaming the marginal edges of imperforate sheets of thermoplastic material which includes the step of heat sealing under pressure a thermoplastic tape along, and to, each opposite face of the zone of contiguity of the margins without uniting the tape to the margins themselves thereby maintaining free flexibility of the material and tape in the centre of the seam.

A further object of the invention is to die cast a multiplicity of small mounds, or rounded protuberances, in the exposed face of a layer of thermoplastic material being heat sealed under pressure to a similar layer of thermoplastic material thereby simultaneously forcing the material of both layers out of a flat plane and increasing the rip resistance of the resulting seam.

Still another object of the invention is to provide a fluid tight seam in a waterproof garment of thermoplastic material in which a pair of opposed tapes are heat sealed in their outer portions along, and to, each opposite side of each opposite face of marginal strips of the material with the intermediate portions of the tapes unconnected to the marginal strips.

Figure 2:
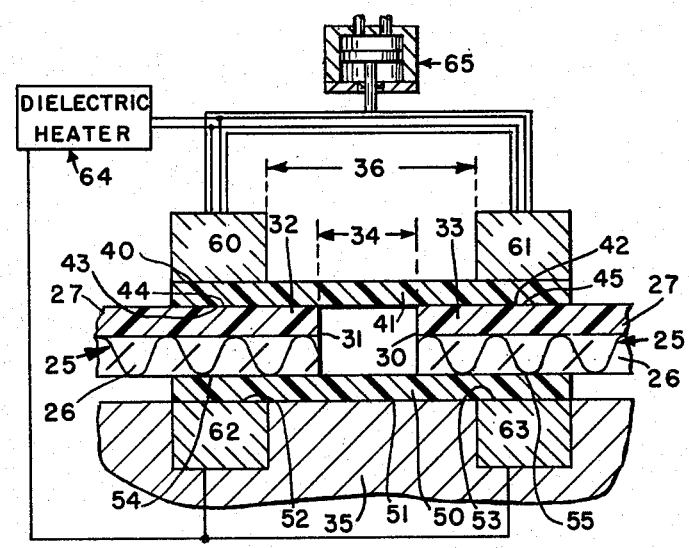
Figure 3:
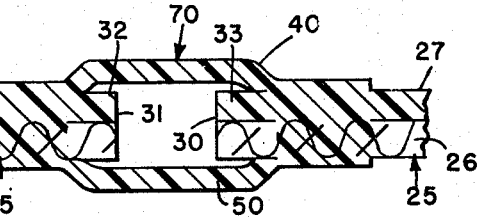
Figure 4:
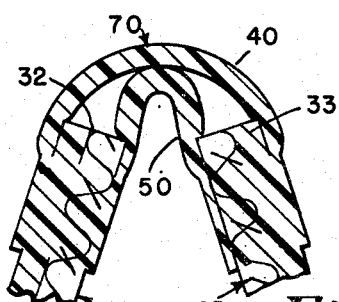
Figure 5:
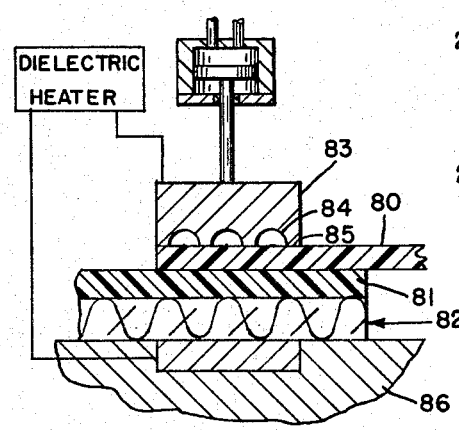
Figure 6:
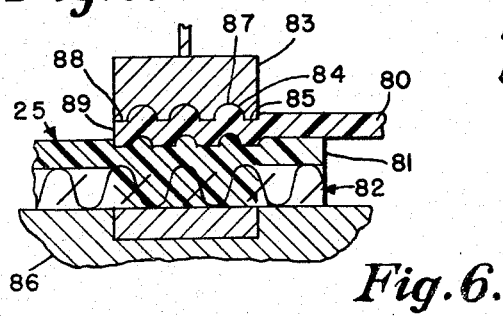

Other objects and advantages of the invention will be apparent from the claims, the description of the drawing and from the drawing in which FIG. 1 is a front elevation of a typical article of thermoplastic sheet material having a seam in accordance with the invention, FIG. 2 is a greatly enlarged, diagrammatic view in cross section on line 3—3 of FIG. 1 showing the parts before heat sealing, FIG. 3 is a view similar to FIG. 2 showing the parts after heat sealing, FIG. 4 is a view similar to FIG. 3 but showing the free flexibility of the seam, FIG. 5 is a fragmentary view similar to FIG. 2 showing the parts in position for the die casting of protuberances in the themoplastic material, and FIG. 6 is a view similar to FIG. 5 showing the parts after the die casting and heat sealing steps.

As shown in FIG. 1, 20 is an article made in accordance with the method of the invention, the article 20 selected for illustration being a wading boot of imperforate thermoplastic sheet material such as vinyl. The article 20 could be any other article of apparel, an air mattress, or the like requiring that marginal strips of the same sheet or marginal strips of separate sheets be heat sealed, or welded, along a seam to form the completed article.

In the wading boot 20, selected for illustration, the boot, or shoe, 21 is formed of relatively thick sheet material 22 with at least the outer layer 23 of a thermoplastic such as vinyl. The upper part 24, which may reach up to the hips of the wearer, is usually formed of relatively thin sheet material 25, such as woven fabric 26 coated with a layer 27 of thermoplastic such as vinyl. The coated woven fabric material 24 is formed into a closed figure by bringing the boundary lines, or edges, 30 and 31 thereof together, so that the marginal strips 32 and 33 are in contiguity and to then heat seal, or weld, the strips 32 and 33 into a seam. Heretofore, it has been customary to superimpose, or overlap, the marginal strips 32 and 33 for seaming and such seams have not been entirely satisfactory in remaining fluid tight even under ordinary wear and tear. The material of the strips 32 and 33 has had reduced flexibility and strength because immobilized by the welding process.

As shown in FIGURES 2, 3 and 4 superimposing or overlapping of the marginal strips 32 and 33 is avoided and butt joining along the boundary lines 30 and 31 is also avoided. Instead the marginal strips 32 and 33 are juxtaposed, in contiguity, preferably with a space 34 between the boundary lines 30 and 31 with both strips in the same plane and resting on a suitable flat planar support 35. I term the elongated, area occupied by the marginal strips 32 and 33 plus the space 34, if any, the zone 36, the zone 36 being coextensive in length with the strips and of a predetermined width preferably of about one-quarter to one-half inch.

An elongated, continuous imperforate tape 40 of flexible, strong, resilient and stretchable thermoplastic such as vinyl is applied along the full length of zone 36, the tape being of greater width than the width of the zone. The intermediate portion 41 of tape 40 thus overlies the strips 32 and 33 in zone 36 while the opposite outer portions 42 and 43 of the tape 40 extend laterally outside the zone 36 to overlie the areas 44 and 45 of the thermoplastic coating 27, just outside zone 36.

Preferably also, a second continuous imperforate tape 50 of material similar to that of tape 40 is applied along the full length of the zone 36 on the opposite face of the sheet material from tape 40. The intermediate portion 51 of tape 50 underlies the woven fabric underface of the strips 32 and 33 in zone 36 while the opposite outer portions 52 and 53 of tape 50 extend laterally outside zone 36 to underlie the mesh of the woven fabric 26 in the areas 54 and 55 thereof, just outside zone 36.

A pair of suitable heating elements 60 and 61 are mounted in the support 35 at a spaced distance apart equal to the width of zone 36 and a corresponding pair of suitable heating elements 62 and 63, spaced apart a distance equal to the width of zone 36 are mounted for movement toward and away from the elements 60 and 61. The elements 60, 61, 62 and 63 may be electrically heated presser bars, or dielectric heater members of any conventional type well known in the art and, therefore, not disclosed in detail herein. A means 64 is diagrammatically illustrated for heating the elements to the particular temperature required to melt and weld the thermoplastic material used, for example about 350° F. and a pressure means 65 is diagrammatically illustrated for applying the desired pressure of heat sealing and welding, which is preferably about 50 p.s.i.

Preferably, simultaneously with the application of the tapes 40 and 50, the heating elements 60 and 61 are pressed toward the heating elements 62 and 63 to heat seal, weld or fuse the outer portions 42 and 43 of tape 40 to the areas 44 and 45 of the coating 27 and the outer portions 52 and 53 of tape 50 to the corresponding areas 54 and 55 of the woven fabric 26. The material of the tape 50 is forced into the mesh of the woven fabric by the pressure of application and the material of the tape 40 is compressed into and merged with the coating 27 so that a firm strong bond is secured. The intermediate portions 41 and 51 of the tapes 40 and 50, however, while in contact with the strips 32 and 33 in zone 36 are not connected therewith, the tapes merely bridging the zone and permitting free flexibility to the marginal strips 32 and 33. Thus as shown in FIG. 4 a double seam, double hinge pivot type of flexible joint is achieved in a seam 70, made in accordance with the method of the invention, and there is no defined shear line at the centre of the seam.

As shown in FIGURES 5 and 6 a die casting step has been found to attain an unusually strong bond between a tape 80, similar to tapes 40 and 50 and the adjacent coating 81 of a sheet 82 similar to sheet 25. A heat and pressure element 83, corresponding to the movable elements 61 or 62, is provided with a multiplicity of rounded pockets such as 84 over its entire plastic contacting face 85. Thus when heat and pressure are applied and the member 83 pressed toward the support 86 corresponding to support 35, the thermoplastic material in the tape 80 is forced into the pockets 84 and the thermoplastic material in the coating 81 is forced into the material of tape 80 to create a multiplicity of small mounds or rounded protuberances, 87 in the exposed face 88 of the tape 80. The die casting, or displacement, of the material of the coating 81 into the plane of the tape 80 produces an increased resistance to fracture or ripping from a direction parallel to, or oblique to the plane of the tape. In addition, the presence of a multiplicity of such mounds has the added advantage of tending to hide or mask the edge 89 of the tape so that seaming is not as evident as with conventional seams and any unevenness in the edge 89 is hidden. As shown in FIGURE 6, the outer face of tape 80, along the intermediate portion thereof, is smooth, planar and free of both depressions and protuberances.

I claim:

1. In an article of flexible, imperforate, thermoplastic sheet material of the type having bounding lines brought together to form a seam, the combination of a pair of free, imperforate, marginal strips, each extending along the full length of one of said bounding lines and together defining an elongated zone of predetermined width and an elongated, imperforate tape of flexible, tough, thermoplastic material having a full length, laterally extending, intermediate portion overlying, but unconnected to, said strips in said zone, said tape having a pair of full length laterally extending outer portions, each on an opposite side of said zone, and each heat sealed to the adjacent, imperforate face of said sheet material whereby said seam is a fluid tight, freely flexible, hinge pivot joint but the free marginal edges of said material at said seam are not united to each other.

2. An article as specified in claim 1 wherein the free marginal strips of said material are juxtaposed in the same plane, the boundary lines thereof are at a spaced distance apart and the outer face of said tape is smooth, planar and free of depressions.

3. An article as specified in claim 1 wherein the outer faces of said full length, laterally extending outer portions of said tape are formed with a multiplicity of small mounds, or dome-like protuberances, the material of the face of said sheet material, to which said portions are heat sealed, extending into said mounds, or dome-like protuberances and the outer face of said intermediate portion of said tape is planar, smooth and free of depressions or protuberances.

4. An article as specified in claim 1 plus a layer of woven fabric on the face of said imperforate sheet material opposite to said tape and a second tape of flexible, tough, thermoplastic, imperforate material, said second tape having a full length, laterally extending, intermediate portion underlying, but unconnected to, said strips and a pair of full length, laterally extending outer portions, each on an opposite side of said zone and each heat sealed to, and impregnated into the mesh of, the adjacent face of said woven fabric.

5. In an article of flexible, imperforate, thermoplastic sheet material of the type having an elongated, narrow, zone in which marginal strips of said material are juxtaposed, or superimposed, and required to be fluid sealed to form said article, the combination of an elongated, narrow tape of flexible, imperforate, thermoplastic material coextensive in length with said zone but of substantially greater width than the width of said zone, said tape having a pair of laterally extending, outer portions each on an opposite side of, and outside, said zone, each said portion being heat sealed to the corresponding imperforate face of said sheet material, outside said zone and having a laterally extending, intermediate portion overlying, but unconnected to, said marginal strips within said zone, thereby forming a double seam, freely flexible, hinge pivot, liquid tight joint in said zone.

6. The method of joining sheets of imperforate, thermoplastic material to form a fluid tight, freely flexible seam which comprises supporting the marginal strips thereof to be joined in contiguity with said marginal strips jointly defining an elongated, relatively narrow zone; applying a imperforate tape of flexible, thermoplastic material along said zone, with the intermediate portions thereof overlying said strips in said zone and the opposite outer portions thereof overlying the imperforate face of said material just outside said zone and subjecting said opposite, outer portions of said tape to heat and pressure to heat seal the same to said face of said material.

7. A method as specified in claim 6 wherein the step of applying heat and pressure includes the step of simultaneously die casting a multiplicity of small mounds, or protuberances, over the face of the outer portions of said tape and over the face of said material underlying said tape outside said zone.

8. A method as specified in claim 6 plus the step of applying a second such imperforate tape along said zone, with the intermediate portion thereof underlying said marginal strips in said zone and the opposite outer portions thereof underlying the imperforate face of said material just outside said zone and simultaneously subjecting the opposite outer portions of both said tapes to heat and pressure to heat seal the same to, and embed the same into, the opposite faces of said material.

9. The method of joining sheets of imperforate, thermoplastic covered woven fabric to form a fluid tight, freely flexible seam which comprises supporting the marginal strips of said sheets in contiguity and with said strips jointly defining an elongated, relatively narrow zone; applying a pair of imperforate, thermoplastic tapes along said zone, one said tape overlying, and the other said tape underlying said marginal strips with each said tape having an outer portion extending outside said zone on an opposite side thereof and, simultaneously with said application step, heat sealing the thermoplastic in the outer portions of said overlying tape to the adjacent thermoplastic layer of said material while heat sealing the thermoplastic in the outer portions of said underlying tape to the woven fabric layer of said material.

References Cited by the Examiner

UNITED STATES PATENTS

| | | | |
|---|---|---|---|
| 2,276,363 | 3/42 | Zalkind | 154—52 |
| 2,402,631 | 6/46 | Hull | 156—272 |
| 2,676,704 | 4/54 | Marks | 156—304 XR |
| 2,888,058 | 5/59 | Manis et al. | 156—209 |

EARL M. BERGERT, *Primary Examiner.*

HAROLD ANSHER, *Examiner.*